US010795861B2

(12) United States Patent
Shatsky et al.

(10) Patent No.: US 10,795,861 B2
(45) Date of Patent: Oct. 6, 2020

(54) ONLINE MEASUREMENT OF POTENTIAL DEDUPLICATION EFFICIENCY

(71) Applicant: International Business Machines Corporation, Armonk, NY (US)

(72) Inventors: Yosef Shatsky, Karnei Shomron (IL); Danny Harnik, Tel Mond (IL); Asaf Porat-Stoler, Tel Aviv (IL); Moshik Hershcovitch, Givatayim (IL)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 16/013,742

(22) Filed: Jun. 20, 2018

(65) Prior Publication Data

US 2019/0392048 A1 Dec. 26, 2019

(51) Int. Cl.
*G06F 17/00* (2019.01)
*G06F 16/174* (2019.01)
*G06F 16/23* (2019.01)

(52) U.S. Cl.
CPC ...... *G06F 16/1748* (2019.01); *G06F 16/2365* (2019.01)

(58) Field of Classification Search
None
See application file for complete search history.

(56) References Cited

U.S. PATENT DOCUMENTS 8,266,115 B1    9/2012  Park et al.
8,280,854 B1 *  10/2012 Emmert ............... G06F 16/185
                                                      707/664
8,280,861 B1    10/2012 Park et al.
8,370,315 B1 *  2/2013  Efstathopoulos ... G06F 16/2228
                                                      707/696
8,650,163 B1    2/2014  Harnik et al.
8,983,952 B1 *  3/2015  Zhang ................. G06F 11/1453
                                                      707/736
9,152,333 B1    10/2015 Johnston et al.
(Continued)

OTHER PUBLICATIONS

Harnik et al., "Estimating Unseen Deduplication—from Theory to Practice," 14th USENIX Conference on File and Storage Technologies, Feb. 2016, 14 pages.

(Continued)

*Primary Examiner* — Hung D Le
(74) *Attorney, Agent, or Firm* — Zilka-Kotab, P.C.

(57) ABSTRACT

A computer-implemented method, according to one embodiment, includes: determining which of a plurality of fingerprints correspond to a copy of user data stored in one or more logical volumes at a storage location, and which of the plurality of fingerprints correspond to a pointer that points to a copy of user data stored in the one or more logical volumes at the storage location. A number of unique fingerprints is determined, and a number of the copies of user data stored in the one or more logical volumes is determined. The number of the copies of user data and the number of unique fingerprints are used to calculate an actual deduplication efficiency value. The number of the copies of user data and the number of unique fingerprints are used to calculate a potential deduplication efficiency value. The actual deduplication efficiency value is compared to the potential deduplication efficiency value.

25 Claims, 10 Drawing Sheets

(56) References Cited

U.S. PATENT DOCUMENTS

| | | | |
|---|---|---|---|
| 9,201,891 | B2 | 12/2015 | Romanski et al. |
| 9,246,511 | B2 | 1/2016 | Kipnis et al. |
| 9,280,571 | B2 | 3/2016 | Daga et al. |
| 9,342,253 | B1* | 5/2016 | Muthukkaruppan ........................ G06F 3/0641 |
| 9,424,285 | B1 | 8/2016 | Condict et al. |
| 9,563,683 | B2 | 2/2017 | Abercrombie et al. |
| 9,646,067 | B2 | 5/2017 | Abercrombie et al. |
| 9,823,905 | B2 | 11/2017 | Ezion et al. |
| 2008/0005141 | A1* | 1/2008 | Zheng ................... G06F 3/0608 |
| 2010/0094817 | A1* | 4/2010 | Ben-Shaul ............. G06F 16/174 707/697 |
| 2011/0184967 | A1* | 7/2011 | Reiter ................. G06F 11/1453 707/758 |
| 2013/0282669 | A1* | 10/2013 | Fiske .................... G06F 3/0641 707/692 |
| 2013/0282670 | A1* | 10/2013 | Fiske ...................... G06F 3/061 707/692 |
| 2013/0282675 | A1* | 10/2013 | Fiske ................. G06F 16/1748 707/692 |
| 2013/0283058 | A1* | 10/2013 | Fiske .................... G06F 21/602 713/189 |
| 2014/0344216 | A1 | 11/2014 | Abercrombie et al. |
| 2014/0351214 | A1 | 11/2014 | Abercrombie et al. |
| 2016/0034201 | A1 | 2/2016 | Chambliss et al. |
| 2016/0034489 | A1 | 2/2016 | Lewis et al. |
| 2016/0299934 | A1 | 10/2016 | Karandikar et al. |
| 2016/0306560 | A1* | 10/2016 | Maranna ............... G06F 3/0619 |
| 2016/0314141 | A1 | 10/2016 | Harnik et al. |
| 2017/0199895 | A1 | 7/2017 | Harnik et al. |
| 2017/0206235 | A1 | 7/2017 | Karandikar et al. |
| 2018/0074745 | A1 | 3/2018 | Harnik et al. |

OTHER PUBLICATIONS

Xie et al., "Estimating Duplication by Content-based Sampling," USENIX Annual Technical Conference, 2013, pp. 181-186.

Harnik et al., U.S. Appl. No. 15/262,066, filed Sep. 12, 2016.

Constantinescu et al., "Quick Estimation of Data Compression and De-Duplication for Large Storage Systems," 2011 First International Conference on Data Compression, Communications and Processing, IEEE, 2011, pp. 98-102.

Harnik et al., "Estimation of Deduplication Ratios in Large Data Sets," IEEE 28th Symposium on Mass Storage Systems and Technologies, MSST, 2012, 11 pages.

* cited by examiner

ONLINE MEASUREMENT OF POTENTIAL DEDUPLICATION EFFICIENCY

BACKGROUND

The present invention relates to storage systems, and more specifically, this invention relates to managing data deduplication in online storage systems.

As data storage and data bandwidth demands increase, the amount and complexity of data that entities regularly manage does as well. In order to meet these increasing demands, large-scale distributed storage systems (including computing and storage clusters) are used to support multiple users across varying applications. Such clusters are typically configured as centralized repositories (either physical or virtual) which are used for the storage, management, and dissemination of data pertaining to one or more users.

Clusters employ applications such as logical volume managers and disk array managers which allocate storage space to users, as well as create units of storage groups which include logical volumes. Moreover, storage virtualization provides an abstraction of logical storage from physical storage such that logical storage may be accessed without end-users identifying physical storage.

For many storage systems, regions having separate logical addresses often include copies of the same (identical versions of) data, or are reused among multiple volumes. However, as the number of these duplicate copies of data increase, they have a significant impact on the storage capacity of a system as a whole, particularly as the amount and complexity of the data being managed continues to increase. As a result, efforts to reduce the amount of duplicate copies stored in the storage system have been implemented in an attempt to improve the efficiency and operational capacity of the storage system. In particular, data deduplication has been implemented to achieve data reduction.

Although data deduplication is able to improve performance, it consumes system resources in doing so. Accordingly, implementing data deduplication typically involves a tradeoff between simplifying implementation to reduce memory consumption, and detection accuracy. Restrictions may thereby be implemented in order to achieve a desired level of performance. According to one example, the size of the storage database may be limited to reduce system overhead. However, this also reduces the number of fingerprints that may be stored in memory. According to another example, the number of bits in a reference counting field may be reduced, thereby decreasing the amount of memory consumed. However, doing so also decreases the number of times the data can be reused.

It follows that the ability to evaluate the effectiveness of a deduplication scheme has an impact on system performance. While conventional products have been able to test deduplication effectiveness in simulated situations, they have been unable to implement testing in non-synthetic settings. Thus, conventional products have been unable to provide feedback to users based on their specific storage system in use.

SUMMARY

A computer-implemented method, according to one embodiment, includes: determining which of a plurality of fingerprints correspond to a copy of user data stored in one or more logical volumes at a storage location, and which of the plurality of fingerprints correspond to a pointer that points to a copy of user data stored in the one or more logical volumes at the storage location. A number of unique fingerprints is determined, and a number of the copies of user data stored in the one or more logical volumes is also determined. The number of the copies of user data and the number of unique fingerprints are used to calculate an actual deduplication efficiency value. Moreover, the number of the copies of user data and the number of unique fingerprints are used to calculate a potential deduplication efficiency value. The actual deduplication efficiency value is compared to the potential deduplication efficiency value, and a result of the comparison is output.

A computer program product, according to another embodiment, includes a computer readable storage medium having program instructions embodied therewith. The computer readable storage medium is not a transitory signal per se. Moreover, the program instructions are readable and/or executable by a processor to cause the processor to perform a method which includes: determining, by the processor, which of a plurality of fingerprints correspond to a copy of user data stored in one or more logical volumes at a storage location, and which of the plurality of fingerprints correspond to a pointer that points to a copy of user data stored in the one or more logical volumes at the storage location. A number of unique fingerprints is determined by the processor, and a number of the copies of user data stored in the one or more logical volumes is also determined by the processor. The number of the copies of user data and the number of unique fingerprints are used, by the processor, to calculate an actual deduplication efficiency value. Moreover, the number of the copies of user data and the number of unique fingerprints are used, by the processor, to calculate a potential deduplication efficiency value. The actual deduplication efficiency value is compared, by the processor, to the potential deduplication efficiency value, and a result of the comparison is output by the processor.

A system, according to yet another embodiment, includes: a processor; and logic integrated with the processor, executable by the processor, or integrated with and executable by the processor. The logic is configured to: determine, by the processor, which of a plurality of fingerprints correspond to a copy of user data stored in one or more logical volumes at a storage location, and which of the plurality of fingerprints correspond to a pointer that points to a copy of user data stored in the one or more logical volumes at the storage location. A number of unique fingerprints is determined by the processor, and a number of the copies of user data stored in the one or more logical volumes is also determined by the processor. The number of the copies of user data and the number of unique fingerprints are used, by the processor, to calculate an actual deduplication efficiency value. Moreover, the number of the copies of user data and the number of unique fingerprints are used, by the processor, to calculate a potential deduplication efficiency value. The actual deduplication efficiency value is compared, by the processor, to the potential deduplication efficiency value, and a result of the comparison is output by the processor.

Other aspects and embodiments of the present invention will become apparent from the following detailed description, which, when taken in conjunction with the drawings, illustrate by way of example the principles of the invention.

DETAILED DESCRIPTION

Figure 1:
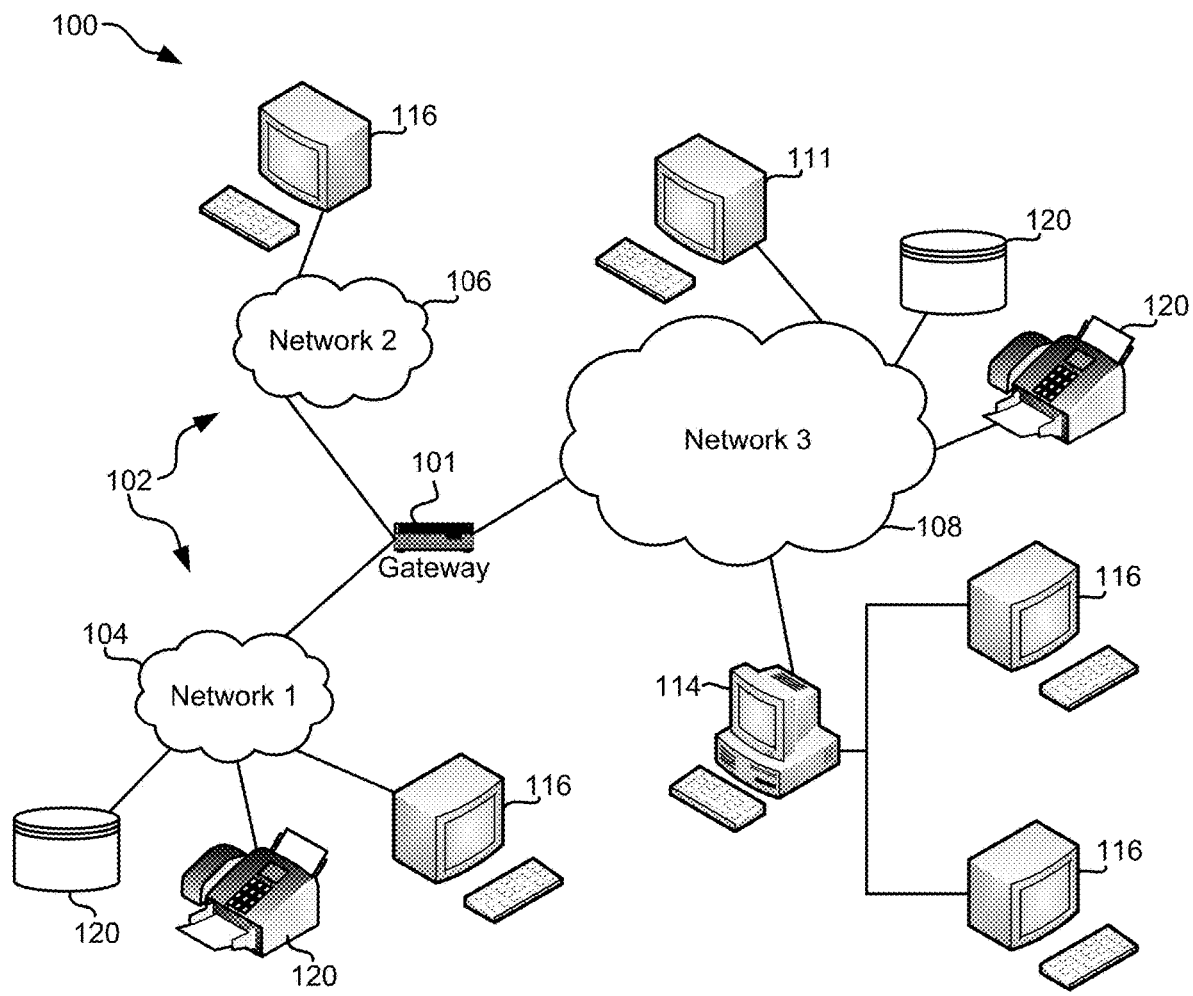
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for evaluating and adjusting the actual deduplication effectiveness levels achieved at storage locations that are being used in non-synthetic data storage environments. Moreover, some of the embodiments described herein are able to determine deduplication effectiveness levels which may potentially be achieved given ideal deduplication conditions. Actual deduplication effectiveness levels may further be compared to potential deduplication effectiveness levels in order to determine an attainable amount of improvement in performance for one or more storage locations that are actually being used to store non-synthetic user data, e.g., as will be described in further detail below.

In one general embodiment, a computer-implemented method includes: determining which of a plurality of fingerprints correspond to a copy of user data stored in one or more logical volumes at a storage location, and which of the plurality of fingerprints correspond to a pointer that points to a copy of user data stored in the one or more logical volumes at the storage location. A number of unique fingerprints is determined, and a number of the copies of user data stored in the one or more logical volumes is also determined. The number of the copies of user data and the number of unique fingerprints are used to calculate an actual deduplication efficiency value. Moreover, the number of the copies of user data and the number of unique fingerprints are used to calculate a potential deduplication efficiency value. The actual deduplication efficiency value is compared to the potential deduplication efficiency value, and a result of the comparison is output.

In another general embodiment, a computer program product includes a computer readable storage medium having program instructions embodied therewith. The computer readable storage medium is not a transitory signal per se. Moreover, the program instructions are readable and/or executable by a processor to cause the processor to perform a method which includes: determining, by the processor, which of a plurality of fingerprints correspond to a copy of user data stored in one or more logical volumes at a storage location, and which of the plurality of fingerprints correspond to a pointer that points to a copy of user data stored in the one or more logical volumes at the storage location. A number of unique fingerprints is determined by the processor, and a number of the copies of user data stored in the one or more logical volumes is also determined by the processor. The number of the copies of user data and the number of unique fingerprints are used, by the processor, to calculate an actual deduplication efficiency value. Moreover, the number of the copies of user data and the number of unique fingerprints are used, by the processor, to calculate a potential deduplication efficiency value. The actual deduplication efficiency value is compared, by the processor, to the potential deduplication efficiency value, and a result of the comparison is output by the processor.

In yet another general embodiment, a system includes: a processor; and logic integrated with the processor, executable by the processor, or integrated with and executable by the processor. The logic is configured to: determine, by the processor, which of a plurality of fingerprints correspond to a copy of user data stored in one or more logical volumes at a storage location, and which of the plurality of fingerprints correspond to a pointer that points to a copy of user data stored in the one or more logical volumes at the storage location. A number of unique fingerprints is determined by the processor, and a number of the copies of user data stored in the one or more logical volumes is also determined by the processor. The number of the copies of user data and the number of unique fingerprints are used, by the processor, to calculate an actual deduplication efficiency value. Moreover, the number of the copies of user data and the number of unique fingerprints are used, by the processor, to calculate a potential deduplication efficiency value. The actual deduplication efficiency value is compared, by the processor, to the potential deduplication efficiency value, and a result of the comparison is output by the processor.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
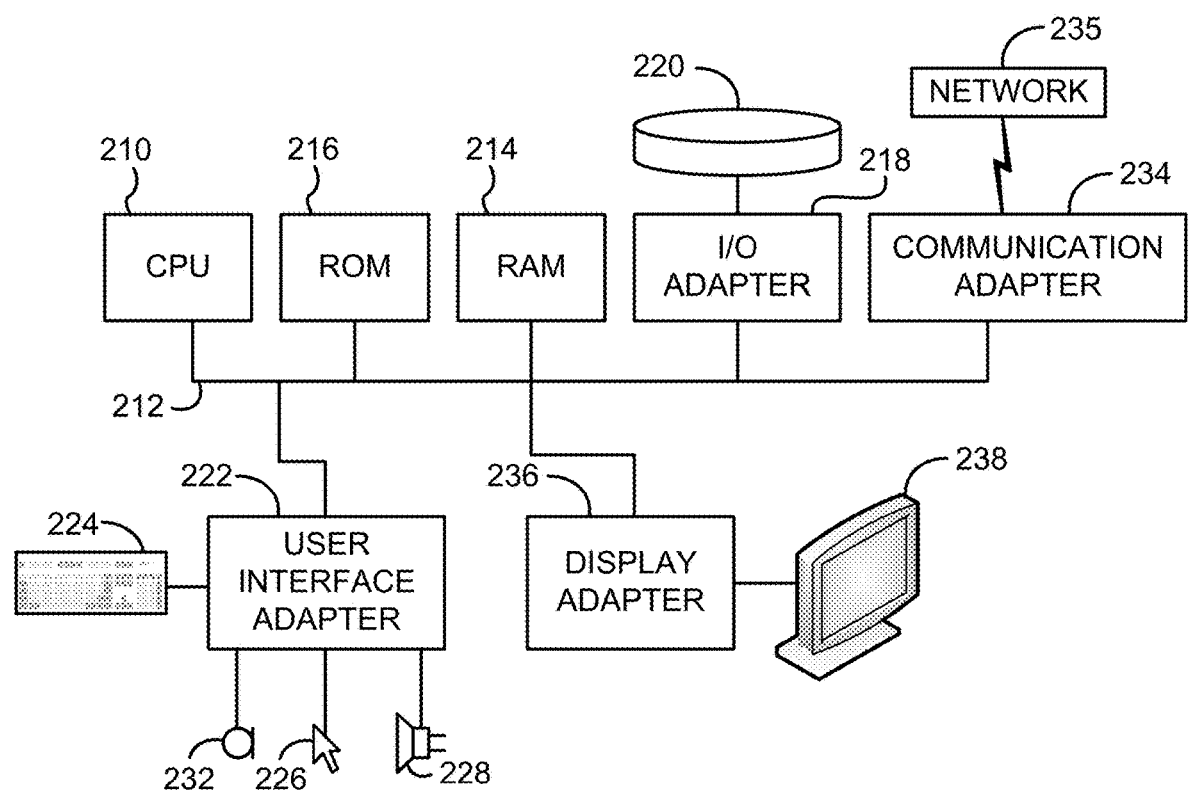
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
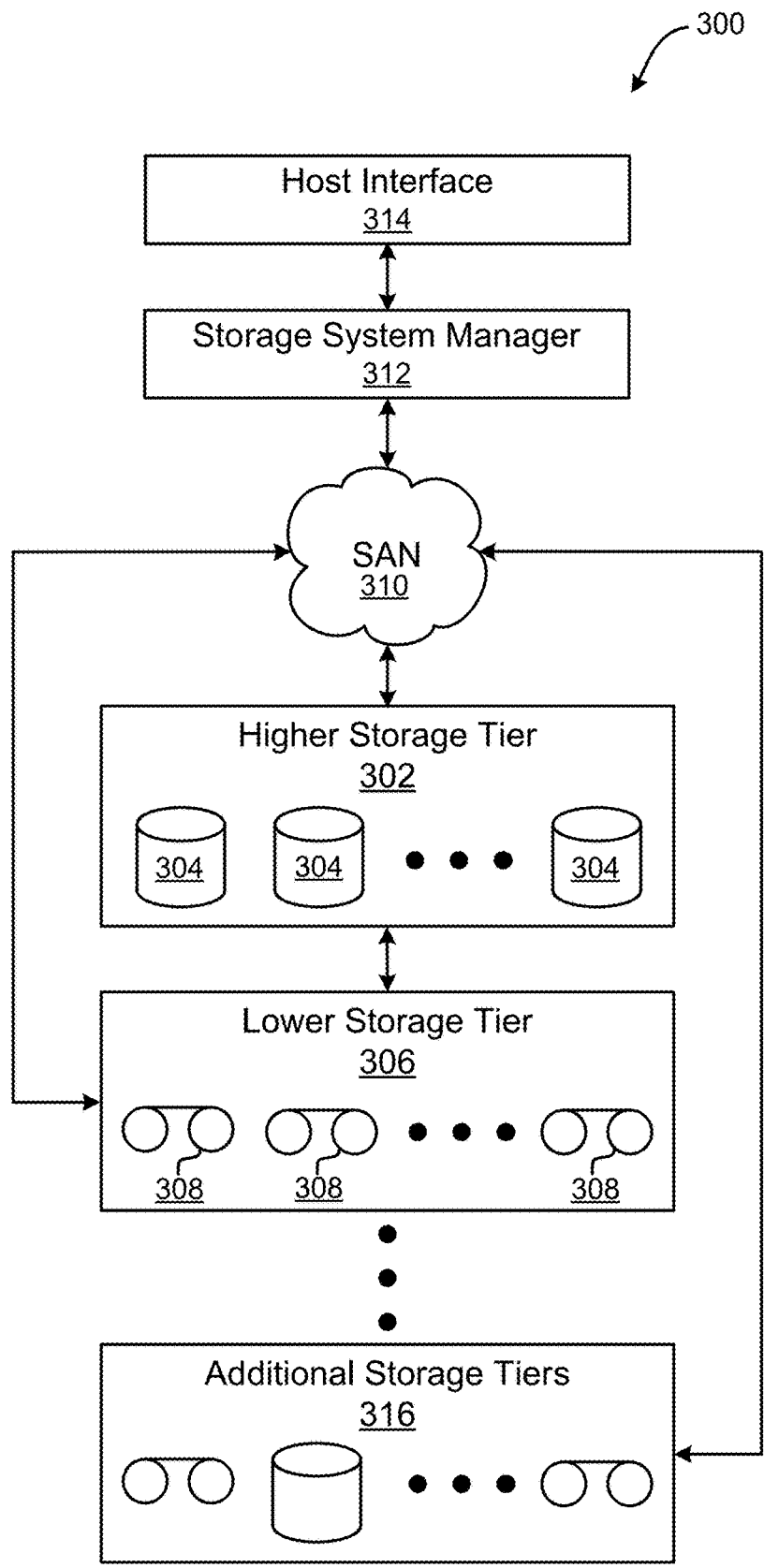
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, storage system regions having separate logical addresses often include copies of the same (identical versions of) data, which may result from inherent workload repetitions. For example, a data storage system may include large numbers of virtual machines. Moreover, the base installation of the virtual machines may be the same for multiple volumes, thereby resulting in the duplication of large regions of data in multiple volumes. In other examples, workloads may include backup snapshots, cloud data sharing services, and cloud-based storage.

As the number of these duplicate copies of data increase, they have a significant impact on the storage capacity of a system as a whole, particularly as the amount and complexity of the data being managed continues to increase. As a result, efforts to reduce the amount of duplicate copies stored in the storage system have been implemented in an attempt to improve the efficiency and operational capacity of the storage system. In particular, data deduplication has been implemented to achieve data reduction.

Although data deduplication is able to improve performance, it consumes system resources in doing so. Accordingly, implementing data deduplication typically involves a tradeoff between simplifying implementation to reduce memory consumption, and detection accuracy. Restrictions may thereby be implemented in order to achieve a desired level of performance. According to one example, the size of the storage database may be limited to reduce system overhead. However, this also reduces the number of fingerprints that may be stored in memory. According to another example, the number of bits in a reference counting field may be reduced, thereby decreasing the amount of memory consumed. However, doing so also decreases the accuracy by which new data may be compared to existing data.

It follows that the ability to evaluate the effectiveness of a deduplication scheme has an impact on system performance. While conventional products have been able to test deduplication effectiveness in simulated situations, they have been unable to implement testing in non-synthetic settings. Thus, conventional products have been unable to evaluate deduplication algorithms during design time, receive any "call home information" from clients regarding deduplication efficiency experienced in practice, or provide feedback to users based on their specific storage system in use.

In sharp contrast, various ones of the embodiments included herein are able to measure the actual deduplication effectiveness levels achieved by storage systems that are in use. Moreover, some of the embodiments described herein are able to determine deduplication effectiveness levels which may potentially be achieved given ideal conditions (e.g., no duplicate copies exist in the entire storage system). Actual deduplication effectiveness levels may further be compared to potential deduplication effectiveness levels in order to determine an attainable amount of improvement, e.g., in the form of capacity savings and/or increased performance efficiency. Moreover, these determinations may be made at a centralized (e.g., off-site) location which is in communication with the storage locations, thereby relieving the storage systems from the corresponding computational overhead, e.g., as will be described in further detail below.

One of the ways which data deduplication is implemented is on new data as it is received at the storage system. The newly received data may be compared to a database which represents data that has already been stored in the system. For instance, a fingerprint may map an arbitrarily large data item (e.g., such as a computer file) to a much shorter bit string. In other words, a fingerprint may effectively serve as a high-performance hash value used to uniquely identify substantial blocks of data. Accordingly, any matches between newly received data and a fingerprint database which represents existing data in the system indicates that a copy of the new data already exists in the system, and that the new write may simply be satisfied by creating a reference to the already existing copy of the data.

The amount of data included in a fingerprint database may be even further reduced by developing a volume sketch which holds a small and representing fraction of the fingerprints (e.g., hash values). Moreover, volume sketch tables as well as mergers of volume sketches may be used to track relationships between underlying data stored in the plurality of volumes in a storage system, and determine a corresponding deduplication effectiveness level.

According to some approaches, the process of maintaining a volume sketch table may include scanning all fingerprint metadata for each volume in a storage system and storing only special fingerprints. Thus, a volume sketch may include the fingerprints that are in the volume and which have a special property (referred to herein as "special fingerprints"). According to an example, which is in no way intended to limit the invention, all the fingerprints that begin with 16 "0" bits may be considered as being special fingerprints. Thus, a sketch may include approximately $\frac{1}{65,536}$ of the fingerprints in the volume. This downsizing desirably allows for the process of developing a volume sketch computationally feasible. However, depending on the desired approach, the special fingerprints may be determined by any predefined and/or specific pattern of bits at any location in the bit string. For instance, according to another example, strings ending with the bit pattern "10011010" may be designated as being special fingerprints.

Figure 4:
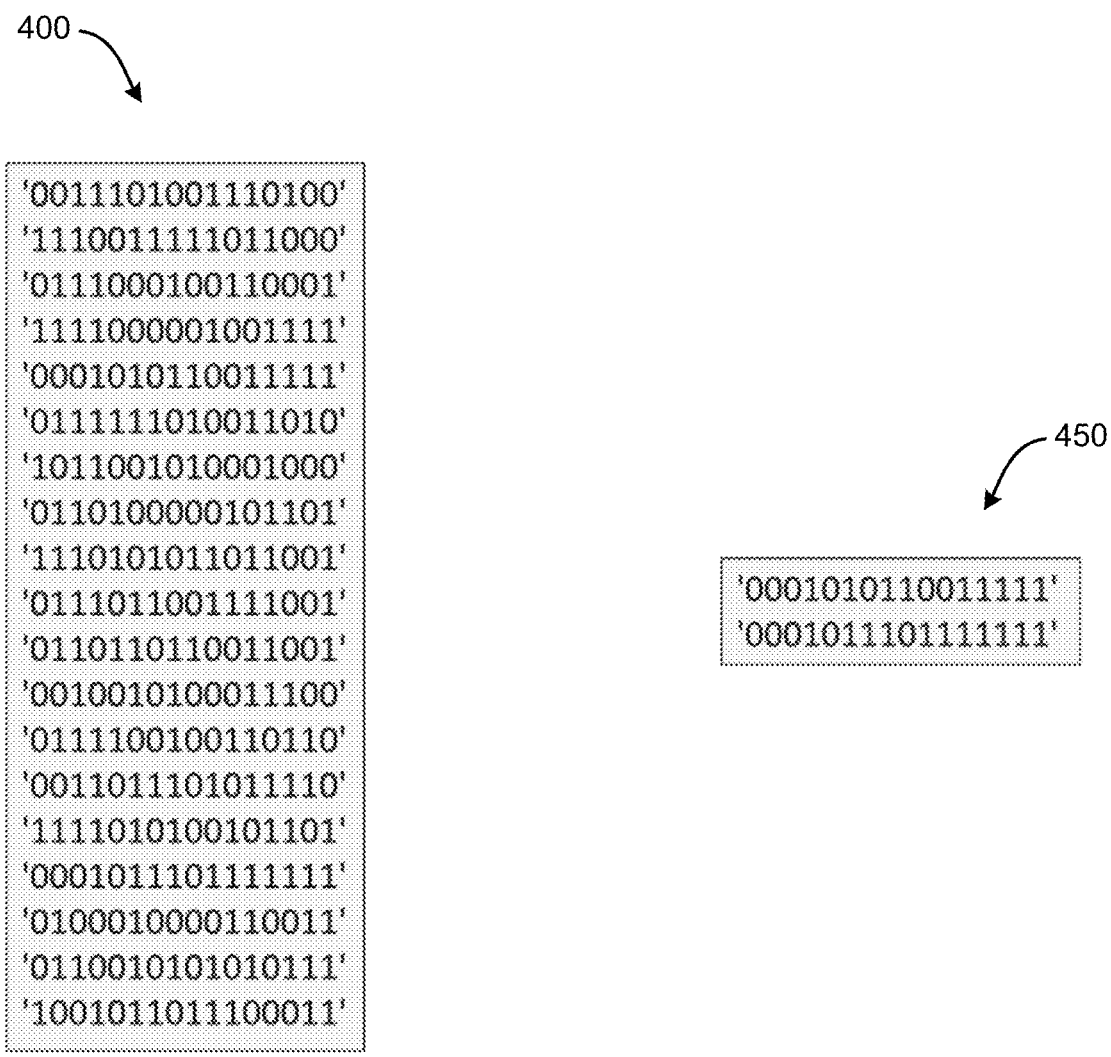
FIG. 4 is a representational view of a fingerprint table and a corresponding volume sketch table in accordance with one embodiment.

Referring momentarily to FIG. 4, the relationship between a fingerprint table 400 and a corresponding volume sketch table 450 is illustrated according to an exemplary embodiment, which is in no way intended to limit the invention. As shown, the fingerprint table 400 includes fingerprints for all the data in a volume, while the volume sketch table 450 only includes the entries in the fingerprint table 400 which are special fingerprints beginning with three consecutive "0" bits. Accordingly, the size of the volume sketch table 450 is much smaller than that of the fingerprint table 400, thereby further reducing impact on storage consumption. The volume sketch table 450 may be stored in a table format in some approaches, although other data structures may be implemented in other approaches, e.g., such as arrays, lists, trees, etc.

In some approaches, a volume sketch table may be formed as a result of performing a fingerprint sampling of the hash space for each logical volume (e.g., storage object) and providing an estimation of deduplication related statistics based on the sampling, e.g., such as deduplication ratios, a reclaimable capacity, etc. Moreover, maintaining a volume sketch such that it accurately represents the data included in a volume over time is desirable. Looking to FIG. 5, a method 500 of maintaining the entries in a sketch table after each write operation performed is illustrated in accordance with one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

Figure 5:
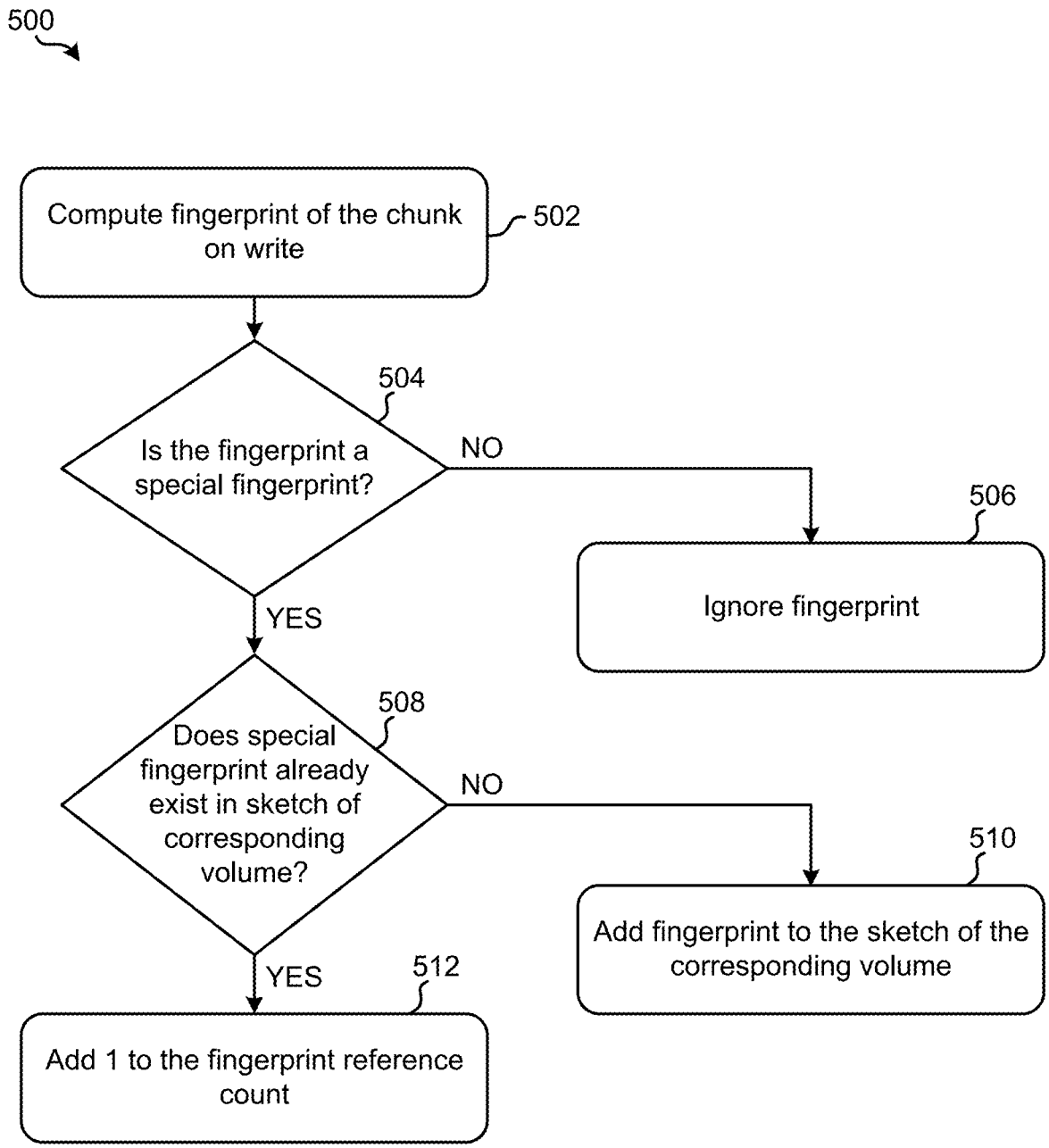
FIG. 5 is a flowchart of a method in accordance with one embodiment.

As shown in FIG. 5, operation 502 of method 500 includes determining (e.g., computing) a fingerprint for a chunk of data included in a write request. Moreover, decision 504 includes determining whether the fingerprint determined in operation 502 is a special fingerprint. The flowchart proceeds to operation 506 in response to determining that the fingerprint is not a special fingerprint, whereby the hash is ignored and method 500 may end as a result. However, method 500 proceeds to decision 508 in response to determining that the fingerprint is a special fingerprint. There, decision 508 includes determining if the special fingerprint already exists in the sketch of the corresponding volume. Operation 510 is performed in response to determining that the fingerprint does not already exist in the sketch of the corresponding volume. As shown, operation 510 includes adding the fingerprint to the sketch of the corresponding volume, after which method 500 may end. Alternatively, method 500 proceeds to operation 512 in response to determining that that the fingerprint does already exist in the sketch of the corresponding volume, whereby a fingerprint reference count is incremented. Thereafter, method 500 may end.

However, it should be noted that although method 500 may end upon reaching one of operations 506, 510, 512, any one or more of the processes included in method 500 may be repeated in order to evaluate additional data in subsequently received write requests. It should also be noted that each of the fingerprints preferably include an identifier which indicates whether the respective fingerprint corresponds to an "owner" (an actual copy of user data stored in memory), or correspond to a "referrer" (a pointer to an actual copy), e.g., as would be appreciated by one skilled in the art after reading to the present description. Accordingly, although not specifically illustrated in FIG. 5, an identifier may be added to each of the fingerprints which are computed in operation 502 and/or which already exist. In some approaches the identifier may be a flag.

Figure 6:
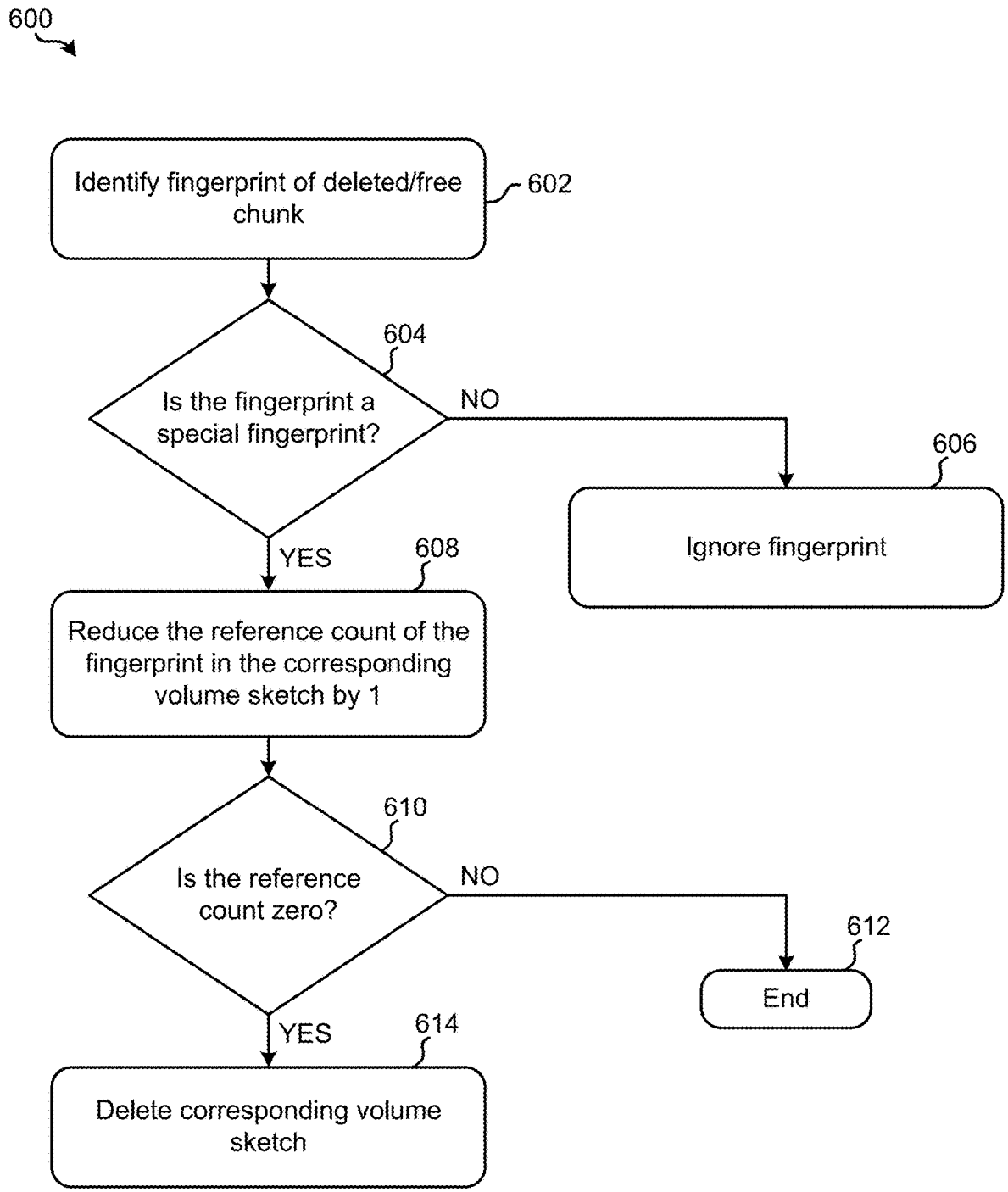
FIG. 6 is a flowchart of a method in accordance with another embodiment.

Similarly, according to one embodiment, data overwrites and deletions may be performed by implementing one or more of the processes included in method 600 in FIG. 6. The method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown, operation 602 includes identifying the fingerprint of the deleted/freed chunk, while decision 604 includes determining if the fingerprint is a special fingerprint. Method 600 proceeds to operation 606 in response to determining that the fingerprint is not a special fingerprint, whereby the fingerprint is ignored and method 600 may end as a result. Returning to decision 604, method proceeds to operation 608 in response to determining that the fingerprint is a special fingerprint. Looking to operation 608, the reference count of the fingerprint is reduced in the corresponding volume by 1.

Furthermore, decision 610 includes determining whether the reference count decremented in operation 608 has been reduced to zero. The flowchart proceeds to operation 612 in response to determining that the reference count is zero, whereby method 600 may be ended. However, returning to decision 610, method 600 proceeds to operation 614 in response to determining that the reference count is zero. There, operation 614 includes deleting the corresponding volume sketch, after which method 600 may be ended.

Because the operations in method 600 are only performed on special fingerprints, the overhead of adding this process in the main path is significantly low. Moreover, it should be noted that although method 600 may end upon reaching one of operations 606, 612, 614 any one or more of the processes included in method 600 may be repeated in order to evaluate additional data in subsequently deleted/freed chunks.

Figure 7:
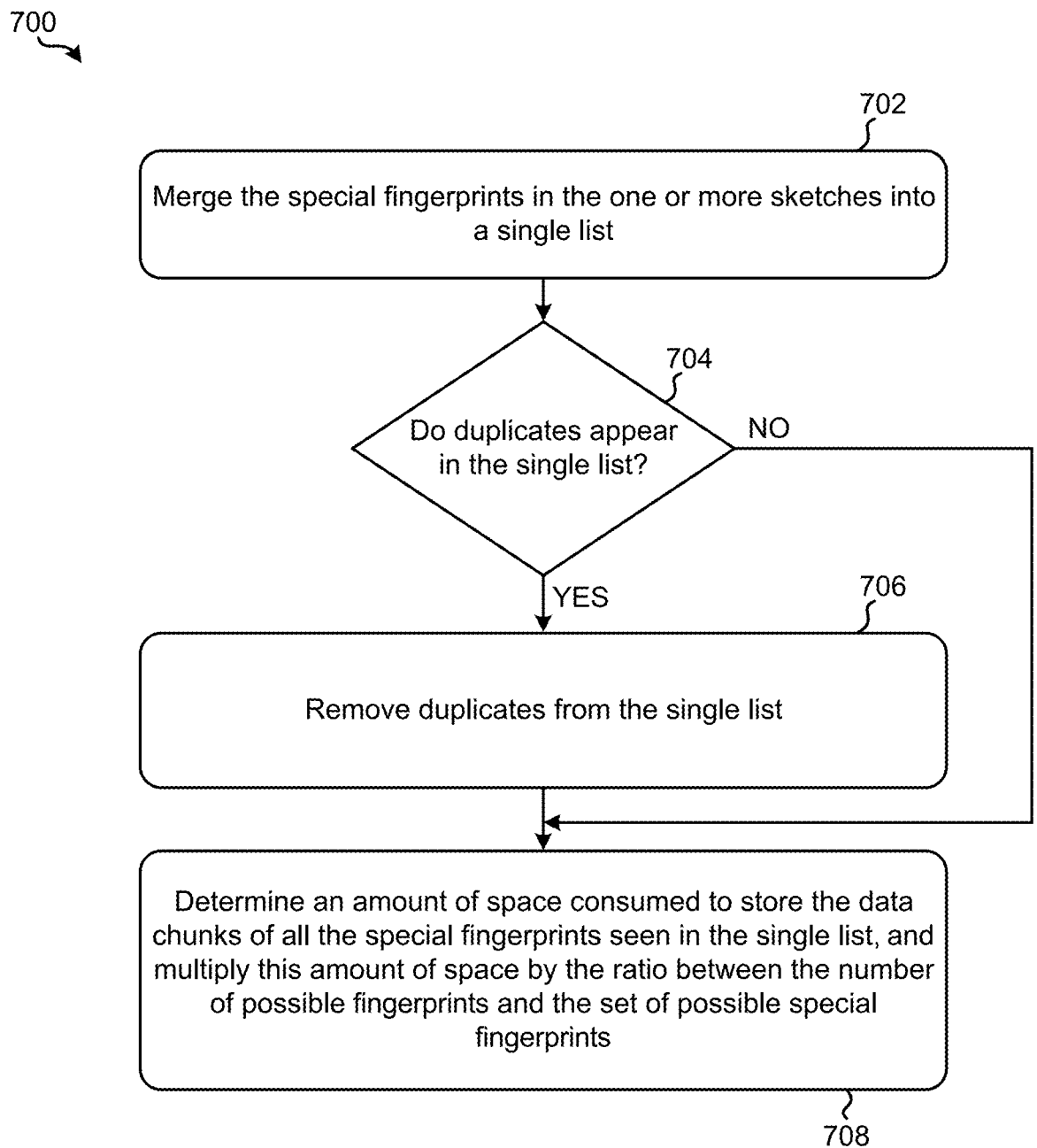
FIG. 7 is a flowchart of a method in accordance with yet another embodiment.

Looking now to FIG. 7, a method 700 for estimating the deduplicated storage size for a given storage environment is illustrated according to one embodiment. The method 700 may be performed in accordance with the present invention in any of the environments depicted in FIGS. 1-4, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown, operation 702 includes combining the sketches for all volumes by merging the special fingerprints in the one or more sketches into a single list which includes all of the special fingerprints in the one or more sketches. Moreover, decision 704 includes determining whether there are duplicates that appear in the merged, single list formed in operation 702. Method 700 proceeds to operation 706 in response to determining that the same fingerprint appears in more than one sketch. There, operation 706 includes uniting (e.g., consolidating) the multiple instances of the same fingerprint into a single fingerprint. As mentioned above, a same fingerprint which corresponds to multiple "owners" indicates missed deduplication potential. In other words, instances in which there are multiple "owners" of a same fingerprint signify that additional deduplication may be performed such that each of the fingerprints have only a single owner, while also potentially having multiple referrers.

In some approaches, the process of actually uniting duplicates instances of a given fingerprint includes updating the information which represents the numbers of owners and referrers which correspond to the fingerprint. For example, one or more flags may be updated such that the number of owners is decremented while the number of referrers is incremented.

Furthermore, operation 708 includes determining the amount of data storage space consumed in order to store the data chunks of each of the special fingerprints seen in the combined sketch, and multiplying the determined amount of space by the ratio between the number of possible fingerprints and the set of possible special fingerprints. Revisiting a previous example in which special fingerprints are defined by 16 consecutive leading "0" bits, the multiplier used in operation 708 would be 65,536. Moreover, referring back to the exemplary embodiment illustrated in of FIG. 4, the volume sketch table 450 holds two fingerprints which correspond to special fingerprints, having a ratio of $(1/2)^3=1/8$. Thus, the estimated physical size for storing the volume fingerprints would be 2×8=16 data chunks.

The benefits afforded by deduplication schemes and volume sketch tables as described in the various approaches above are preferably implemented in the context of active, existing data storage systems. As previously mentioned, while conventional products have been able to test deduplication effectiveness in simulated situations, they have been unable to implement testing in non-synthetic settings. Thus, conventional products have been unable to provide feedback to users based on their specific storage system in use. These conventional products only provide off-line procedures which are targeted at understanding the potential of deduplication with respect to data sets that have no deduplication implemented.

Again, in sharp contrast to these conventional shortcomings, various ones of the embodiments included herein are able to introduce online deduplication schemes, some of which are able to provide an estimation of potential savings in systems that already perform deduplication. Moreover, these improvements may be implemented in addition to managing volume statistics in the presence of deduplication, e.g., as would be appreciated by one skilled in the art after reading the present description.

Figure 8:
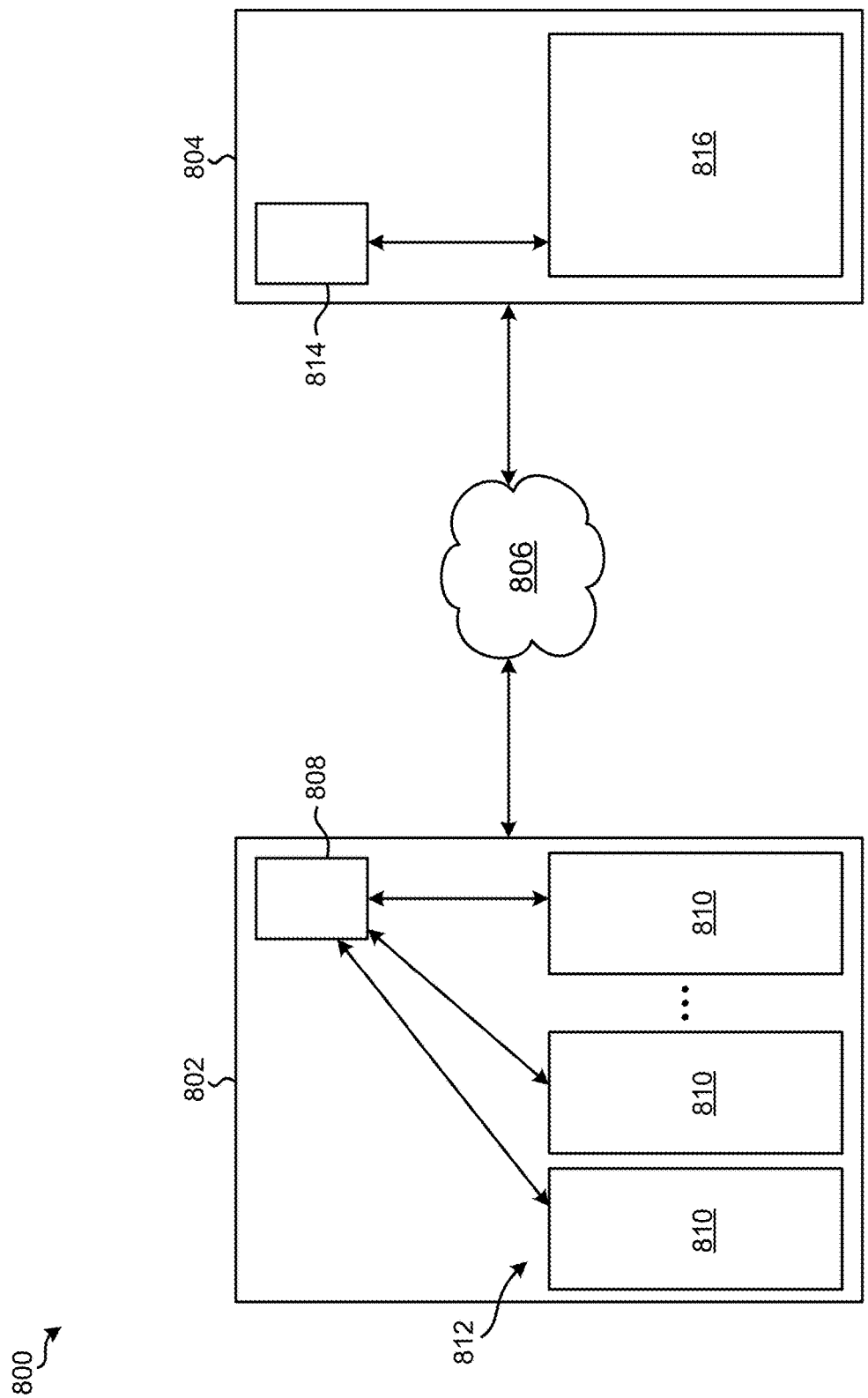
FIG. 8 is a partial representational view of a distributed data storage system in accordance with one embodiment.

Looking to FIG. 8, a distributed data storage system 800 is illustrated in accordance with one embodiment. As an option, the present system 800 may be implemented in conjunction with features from any other embodiment listed herein, such as those described with reference to the other FIGS. However, such system 800 and others presented herein may be used in various applications and/or in permutations which may or may not be specifically described in the illustrative embodiments listed herein. Further, the system 800 presented herein may be used in any desired environment. Thus FIG. 8 (and the other FIGS.) may be deemed to include any possible permutation.

As shown, the distributed data storage system 800 includes a storage location 802 and a central storage management location 804. Both locations 802, 804 are shown as being connected over a network 806 and may therefore be in communication with each other. Accordingly, data, information, commands, requests, etc. may be freely transferred between the storage location 802 and the central storage management location 804.

Depending on the amount and/or type of separation between the storage location 802 and the central storage management location 804, the network 806 connecting the two locations 802, 804 may be a LAN, a WAN (e.g., such as the Internet), a PSTN, an internal telephone network, a SAN, etc., or any other type of network. Moreover, the locations 802, 804 may be coupled to the network 806 using a wireless connection, e.g., WiFi, Bluetooth, a cellular network, etc.; a wired connection, e.g., a cable, a fiber-optic link, a wire, etc.; etc., or any other type of connection which would be apparent to one skilled in the art after reading the present description. It follows that the central storage management location 804 may be significantly removed from the storage location 802 in some approaches. Moreover, although not shown in FIG. 8, the central storage management location 804 may be coupled to more than one different storage location. As a result, the central storage management location 804 may provide deduplication instructions to more than one (e.g., multiple) different storage locations, each of the storage locations actually being in use and including different user-based data, e.g., depending on the approach.

Looking to the storage location 802, a storage controller 808 communicates with each of the storage devices 810 in a storage array 812. Depending on the approach, one or more of the storage devices 810 may include HDDs, SSDs, magnetic tape, etc., or any other type of memory. Moreover, the storage location 802 may implement more than one storage array (not shown) in some approaches. Each of the storage arrays may also have a different type of memory associated therewith, the different types of memory having different performance levels, such that the storage location 802 serves as a multi-tiered data storage location (e.g., see storage system 300 of FIG. 3 above).

Referring still to FIG. 8, the storage location 802 may correspond to one or more users and may therefore be used to store user-based information (e.g., data). In other words, storage location 802 may be implemented as a user-based storage location which is used to store user-based information according to in-use situations. The user-based information may be stored in various logical volumes in the storage array 812, e.g., according to any of the approaches described above. Accordingly, the storage controller 808 may implement (e.g., serve as) a logical volume manager which is able to concatenate, stripe together, or otherwise combine partitions (or block devices in general) into larger virtual partitions which may be re-sized and/or moved, potentially without interrupting system use, as would be appreciated by one skilled in the art after reading the present description.

Although the storage location 802 may be capable of implementing storage simulations and/or storing simulated data, in preferred approaches the storage devices 810 in the storage array 812 are used to update, write, delete, read, etc. data which actually corresponds to in-use user requests to do so. The connection to the central storage management location 804 over the network 806 may thereby provide a communication channel by which deduplication instructions may be received and implemented in order to improve data storage usage, reduce performance delays, increase data capacity, reduce wear on memory components, etc. experienced by the system 800 as a whole, e.g., as will be described in further detail below.

The central storage management location 804 includes a controller 814 which is in communication with memory module 816. The memory module 816 may include any desired type of memory (e.g., HDDs, SSDs, magnetic tape, etc.). According to some approaches, the memory module 816 may store deduplication information which corresponds to the data stored in the storage array 812 of the storage location 802. For instance, the central storage management location 804 may receive deduplication information from the storage location 802 as the storage devices 810 are used to store (e.g., write, update, delete, etc.) data over time. The memory module 816 may thereby store a fingerprint database and/or a volume sketch table which corresponds to the deduplication information received from the storage location 802, and therefore corresponds to the data stored in the storage array 812 as well.

It follows that the central storage management location 804 may be used to manage the data deduplication process implemented at the storage location 802 and/or other storage locations which may be in communication with the central storage management location 804 over the network 806 and/or other communication channels. For instance, the controller 814 and/or memory module 816 may be used to perform any one or more of the processes included in method 900 below.

Figure 9A:
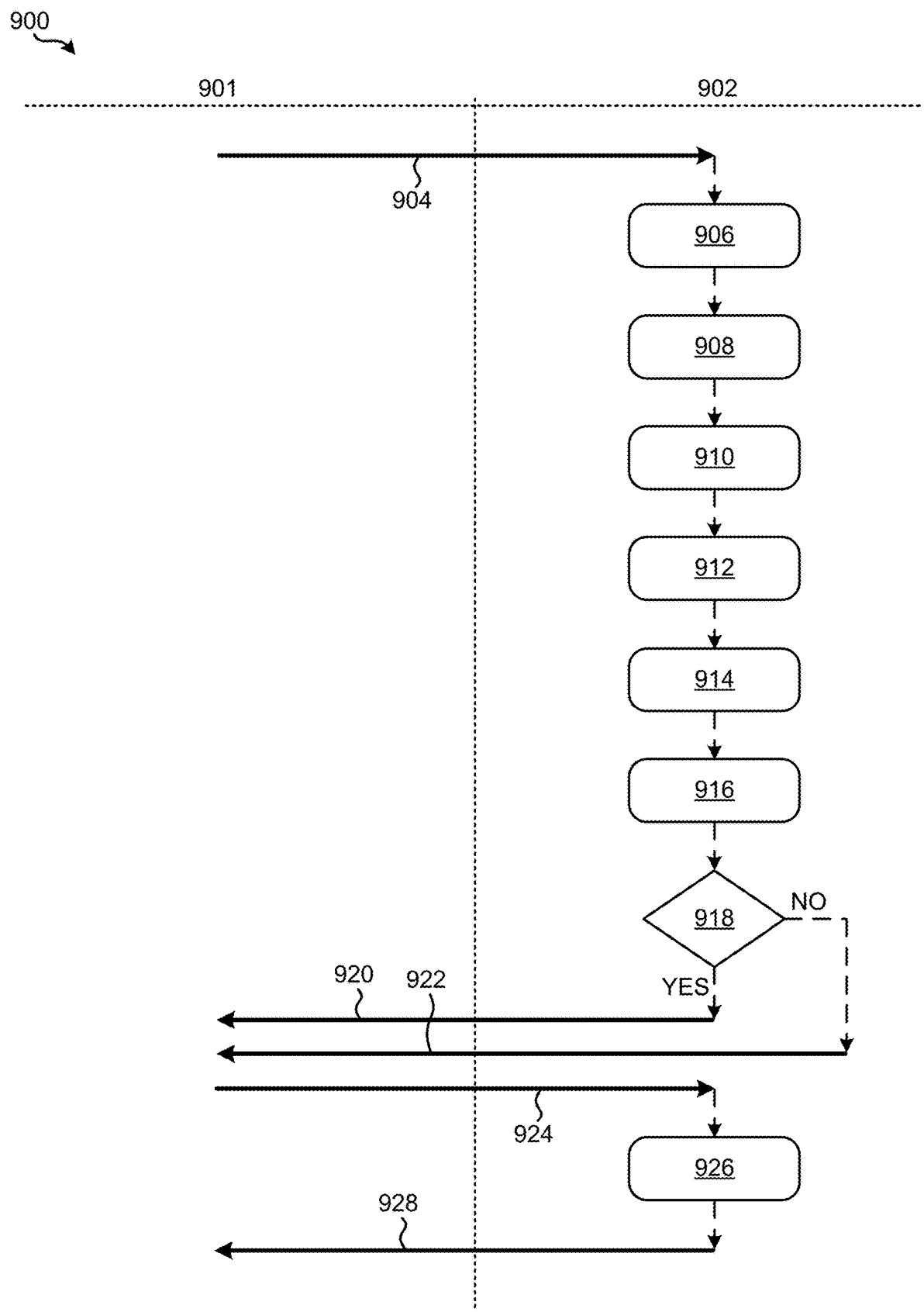
FIG. 9A is a flowchart of a method in accordance with one embodiment.

Looking now to FIG. 9A, a flowchart of a computer-implemented method 900 is shown according to one embodiment. The method 900 may be performed in accordance with the present invention in any of the environments depicted in FIGS. 1-8, among others, in various embodiments. Of course, more or less operations than those specifically described in FIG. 9A may be included in method 900, as would be understood by one of skill in the art upon reading the present descriptions.

Each of the steps of the method 900 may be performed by any suitable component of the operating environment. For example, each of the nodes 901, 902 shown in the flowchart of method 900 may correspond to one or more processors positioned at a different location in a distributed data storage system. Moreover, each of the one or more processors are preferably configured to communicate with each other.

In various embodiments, the method 900 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 9A includes different nodes 901, 902, each of which represent one or more processors, controllers, computer, etc., positioned at a different location in a distributed data storage system. For instance, node 901 may include one or more processors which are electrically coupled to a storage location of a distributed data storage system (e.g., see storage location 802 of FIG. 8 above). Node 902 may include one or more processors which are electrically coupled to a central storage management location of a distributed data storage system (e.g., see 804 of FIG. 8 above). Accordingly, commands, data, requests, etc. may be sent between each of the nodes 901, 902 depending on the approach. Moreover, it should be noted that the various processes included in method 900 are in no way intended to be limiting, e.g., as would be appreciated by one skilled in the art after reading the present description. For instance, data sent from node 901 to node 902 may be prefaced by a request sent from node 902 to node 901 in some approaches.

As shown, operation 904 of method 900 includes receiving a plurality of fingerprints from a storage location. The fingerprints may correspond to one or more logical volumes located on (stored in) the memory of a user-based storage location. Accordingly, the fingerprints may correspond to memory which includes non-synthetic, user generated data. Moreover, the fingerprints may be received differently depending on the approach. For instance, in some approaches the fingerprints may be included in hash information which is received from the storage location at node 901, such that "fingerprint sampling" may be performed on the hash information received.

While each fingerprint may correspond to a logical volume located on (stored in) the memory of a user-based storage location, the manner in which each fingerprint corresponds to a given logical volume may differ. For instance, some fingerprints may correspond to an actual copy of user data that is stored in memory, while other fingerprints correspond to a pointer which points to one of the actual copies of user data. As alluded to above, data deduplication is a specialized data compression technique which removes duplicate copies of the same data. In other words, a storage system implementing data deduplication strives to achieve an "ideal" storage environment in which only one copy of each file exists in memory, and any additional references to and/or instances of the same file merely exist in the memory as pointers which refer back to the single actual copy of the file. This desirably increases the efficiency by which the storage system utilizes the finite amount of storage space.

Accordingly, operation 906 further includes determining which of the plurality of fingerprints correspond to a copy of user data stored in one or more logical volumes at a storage location, and which of the plurality of fingerprints correspond to a pointer that points to a copy of user data stored in the one or more logical volumes at the storage location. In other words, operation 906 may include determining which of the received fingerprints correspond to an "owner" (an actual copy of user data stored in memory), and which of the received fingerprints correspond to a "referrer" (a pointer to an actual copy), e.g., as would be appreciated by one skilled in the art after reading to the present description.

Figure 9B:
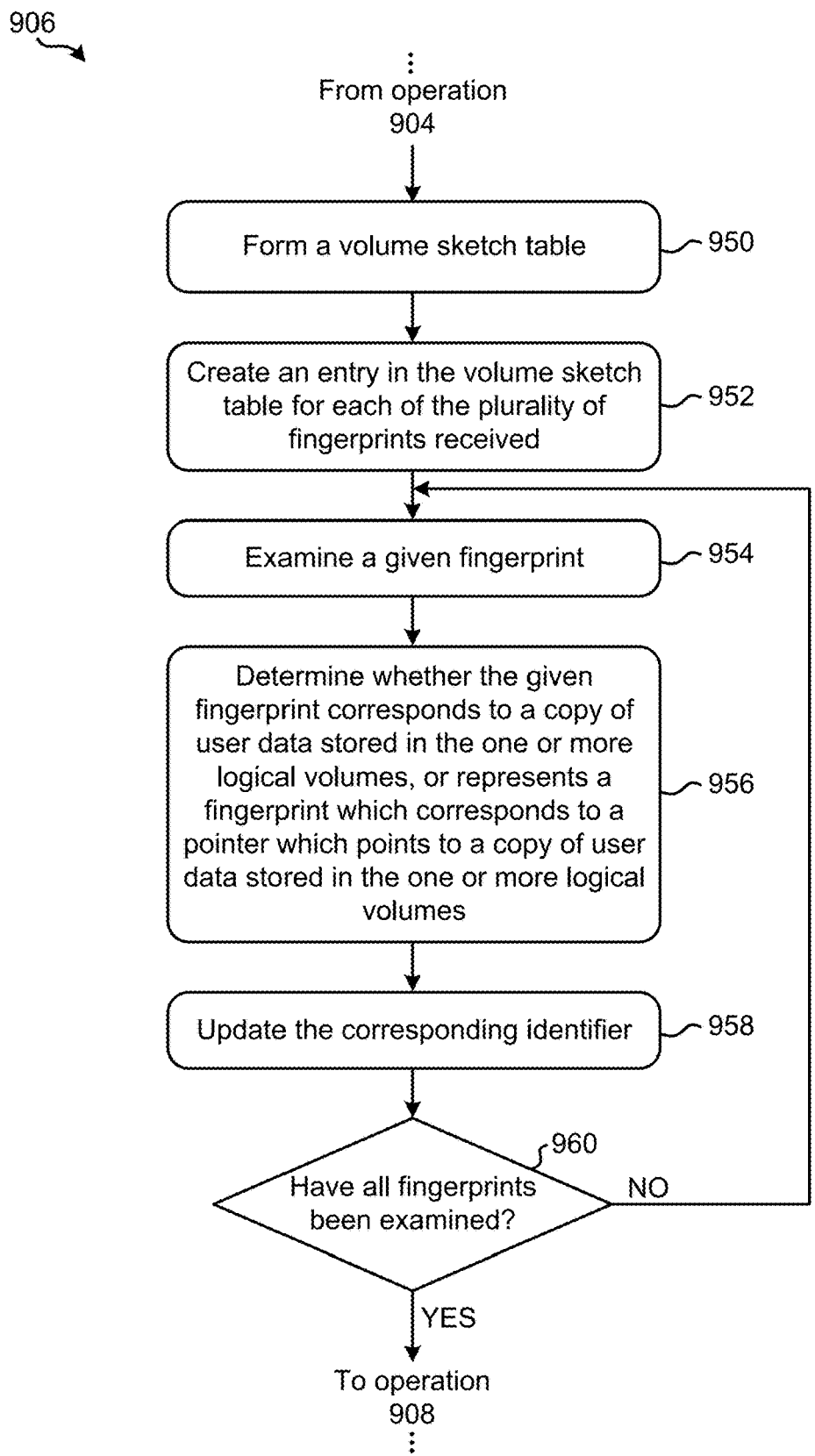
FIG. 9B is a flowchart of sub-processes for one of the operations in the method of FIG. 9A, in accordance with one embodiment.

Referring momentarily to FIG. 9B, exemplary sub-processes of determining which of the plurality of fingerprints correspond to a copy of user data, and which correspond to a pointer are illustrated in accordance with one embodiment, one or more of which may be used to perform operation 906 of FIG. 9A. It should also be noted that any one or more of the sub-processes included in FIG. 9B may implemented in order to perform operation 510 of FIG. 5 above. However, it should be noted that the sub-processes of FIG. 9B are illustrated in accordance with one embodiment which is in no way intended to limit the invention.

As shown, FIG. 9B includes forming a volume sketch table. See sub-operation 950. The process of forming a volume sketch table may include any one or more of the approaches described above, e.g., in reference to FIGS. 4-7. For instance, as alluded to above, sub-operation 950 and/or any of the other sub-processes included in FIG. 9B may be implemented in order to perform operation 510 of FIG. 5 above. A size of the volume sketch table may correspond to a size (e.g., storage capacity) of the storage location from which the plurality of fingerprints was received.

Moreover, sub-operation 952 includes creating an entry in the volume sketch table for each of the plurality of fingerprints received. Each of the entries created also preferably includes an identifier which may be used to indicate a status of the corresponding entry in the volume sketch table. Accordingly, the identifiers may include a designated bit, a flag, a condition code register, etc.

Looking to sub-operation 954, a given fingerprint is examined. Moreover, sub-operation 956 includes determining whether the given fingerprint corresponds to a copy of user data stored in the one or more logical volumes, or represents a fingerprint which corresponds to a pointer which points to a copy of user data stored in the one or more logical volumes. In other words, sub-operation 956 includes determining whether the given fingerprint corresponds to an "owner" or corresponds to a "referrer". In some approaches, the determination made in sub-operation 956 may actually be a property of a deduplication mechanism. Accordingly, information corresponding to the fingerprint and/or the fingerprint itself may be passed over to the volume sketch table such that the determination may be made by the deduplication mechanism.

Moving to sub-operation 958, FIG. 9B includes updating the identifier which corresponds to the given fingerprint to indicate the result of the determination made in sub-operation 956. Thus, sub-operation 958 includes updating the identifier based on whether the respective entry in the sketch table represents a fingerprint which corresponds to an "owner" or corresponds to a "referrer". Furthermore, decision 960 includes determining whether all of the fingerprints included in the plurality of fingerprints received in operation 904 have been examined. The flowchart returns to sub-process 954 in response to determining that all of the fingerprints have not yet been examined, such sub-processes 954, 956, 958 may be repeated for at one more fingerprint which has not yet been examined. However, the flowchart is shown as proceeding from decision 960 to operation 908 of FIG. 9A in response to determining that all of the fingerprints included in the plurality of fingerprints have been examined.

Returning to FIG. 9A, operation 908 includes determining a number of the plurality of fingerprints received in operation 904 which are unique fingerprints. Again, although the manner in which each fingerprint corresponds to a given logical volume may differ, each fingerprint does correspond to a logical volume stored in the memory of a user-based storage location. Some of the fingerprints may correspond to the same logical volume. For instance, two or more fingerprints may correspond to pointers that point to a same copy of user data in the same logical volume in some approaches. In other approaches, one fingerprint may correspond to a copy of user data stored in a logical volume, while a second fingerprint corresponds to a pointer that points to the same copy of user data. It follows that with respect to the present description, there is only one "unique fingerprint" which corresponds to each copy of user data stored in a given storage location. In other words, each fingerprint which corresponds to a same copy of data as a fingerprint which has already been incorporated in the number of unique fingerprints is excluded from further incrementing the number of unique fingerprints.

According to an example, which is in no way intended to limit the invention, a first fingerprint corresponds to a first actual copy of user data stored in memory, while a second fingerprint corresponds to a second actual copy of user data stored in memory which includes the same data as the first actual copy of user data. In this situation, although there are two fingerprints, each of which point to an actual copy of user data stored in memory, they only amount to one "unique fingerprint", because the copy of user data they correspond to is the same.

Moreover, operation 910 includes determining a number of the copies of user data stored in the one or more logical volumes. In other words, operation 910 includes determining a number of actual copies of user data that are stored in memory in a given storage location. In some approaches, the identifiers in a volume sketch table may be used to perform operation 910. As described above with respect to FIG. 9B, a volume sketch table may use identifiers to indicate which entries in the table correspond to an actual copy of user data stored in memory, and which entries in the table correspond to a pointer which points to an actual copy of user data stored in memory. Accordingly, operation 910 may include examining the identifiers to determine a number of actual copies of user data are stored in memory.

Operation 912 includes using the number of copies of user data (determined in operation 910) and the number of unique fingerprints (determined in operation 908) to calculate an actual deduplication efficiency value. An actual deduplication efficiency value may represent the efficiency by which data deduplication is being implemented at a given storage location. In other words, the actual deduplication efficiency value determined in operation 912 may represent the level of success by which data deduplication is being implemented at the storage location that the plurality of fingerprints was received from in operation 904.

According to some approaches, the actual deduplication efficiency value may be calculated by comparing the number of unique fingerprints with the number of copies of user data stored in memory at the storage location. As previously mentioned, a storage system implementing data deduplication may strive to achieve an "ideal" storage environment in which only one actual copy of each file exists in memory, and any additional references to and/or instances of the same file merely exist in the memory as pointers which refer back to the single actual copy of the file. Accordingly, an "ideal" implementation of data deduplication may result in a situation where the number of unique fingerprints is equal to the number of actual copies of user data in the storage location. Comparatively, as the number of actual copies of the same user data increase in memory at the storage location, the number of unique fingerprints does not as no new copies of user data are being introduced. As a result, the ratio between the number of unique fingerprints and the number of actual copies of user data in the storage location is no longer equal, and the actual deduplication efficiency value drops as a result.

With continued reference to FIG. 9A, operation 914 includes using the number of the copies of user data and the number of unique fingerprints to calculate a potential deduplication efficiency value associated with the storage location that the plurality of fingerprints was received from in operation 904. As mentioned above, a storage system implementing data deduplication may strive to achieve an "ideal" storage environment in which only one copy of each file exists in memory, and any additional references to and/or instances of the same file merely exist in the memory as pointers which refer back to the single actual copy of the file. Thus, depending on the actual deduplication efficiency value a given storage location has achieved, the deduplication efficiency value which the storage location is capable of attaining may differ.

Operation 914 further includes comparing the actual deduplication efficiency value to the potential deduplication efficiency value. The difference between the actual deduplication efficiency value and the potential deduplication efficiency value may provide an accurate representation of the improvements to data deduplication which may be attainable at the storage location. Thus, by comparing the two deduplication efficiency values, operation 914 may be used to determine whether making improvements (e.g., adjustments) to the deduplication scheme implemented at the storage location is possible and/or desirable. Some of the approaches described herein may even able to identify missed deduplication potential at specific locations in memory being used to store non-synthetic user data as a result of performing a single scan. Some approaches may also be able to determine whether this missed potential is related to specific volumes and/or other identifiers of specific groupings of data. Moreover, this functionality is achieved in the context of an online system which may connect a central storage management location to multiple user-based storage locations, e.g., as will be described in further detail below.

Operation 916 of method 900 may include outputting a result of the comparison performed in operation 914. For instance, a result of the comparison may be output for storage in memory, sent to the storage location at node 901, output for further analysis, added to call home information, etc., depending on the desired approach. According to an example, which is in no way intended to limit the invention, a result of the comparison made in operation 914 may be output to the storage location at node 901 such that a user which corresponds to the user-based information stored in memory at node 901 may determine whether deduplication improvements should be implemented in an effort to increase the actual deduplication efficiency value. In another example, which is in no way intended to limit the invention, the result of the comparison may provide call home information from clients regarding the efficiency of deduplication which is actually performed in the field at the clients' location. According to the present description, "call home information" refers to performance-based information which corresponds to actual implementation at a consumer location which may be sent back to a central processing and/or management location for analysis. Thus, the call home information may serve as a way for the central processing and/or management location to monitor performance at one or more respective customer locations, e.g., as would be appreciated by one skilled in the art after reading the present description.

Decision 918 includes determining whether the difference between the actual deduplication efficiency value and the potential deduplication efficiency value is outside a range. Some storage locations may have a level of data deduplication efficiency which is desirably achieved. This level of data deduplication efficiency may correspond to a storage capacity of the storage location, a type of memory implemented at the storage location, user preferences, data sensitivity, etc. It follows that in situations where the actual deduplication efficiency value is undesirably low compared to the potential deduplication efficiency value (outside the range), proactive steps may be taken to improve the actual deduplication efficiency value.

Depending on the approach, the range may be predetermined by a user, correspond to current system settings, determined by accessing a lookup table, etc. It should be noted that "outside a range" is in no way intended to limit the invention. For instance, rather than determining whether a value is outside of a range, equivalent determinations may be made, e.g., as to whether a value is above a threshold, whether a value is inside a predetermined range, whether an absolute value is above a threshold, whether a value is below a threshold, etc., depending on the desired approach. Moreover, the "determining" performed in decision 918 may be a result of the comparison performed in operation 916, gleaned from a separate calculation performed (e.g., such as simple subtraction), etc., depending on the desired approach.

As mentioned above, proactive steps may be taken in an effort to improve the actual deduplication efficiency value in response to determining that it is undesirably low compared to the potential deduplication efficiency value. Accordingly, method 900 proceeds to operation 920 in response to determining that the difference between the actual deduplication efficiency value and the potential deduplication efficiency value is outside the range. There, operation 920 includes sending one or more instructions to the storage location to adjust deduplication settings which will improve the actual deduplication efficiency value moving forward. In other words, operation 920 includes sending one or more instructions to the storage location in an effort to cause improvements to the deduplication efficiency value achieved at the storage location.

The actual deduplication efficiency value for a given storage location may be improved in a number of different ways depending on the approach. For instance, a size of a fingerprint database implemented at a storage location may have an effect on the actual deduplication efficiency value achieved. As the size of the fingerprint database increases, more fingerprints may be stored therein, thereby improving the accuracy by which the data in memory is represented in the deduplication process. Accordingly, in some approaches operation 920 may include sending one or more instructions to increase a size of a fingerprint database which corresponds to the one or more logical volumes at the storage location.

In other approaches, operation 920 may include sending one or more instructions to increase a size of the field for a reference counter which corresponds to the one or more logical volumes. Again, pointers may be used by logical volumes to point to a copy of user data stored at a storage location. However, the size of (e.g., number of bits which represent) a reference counter used to indicate the number of logical volumes which are pointing to a same copy of user data, may limit the number of pointers that may be indicated. For example, a two bit counter may only be able to indicate that up to four different pointers point to a same copy of user data. Thus, the fifth, sixth, seventh, etc. pointers which also point to the same copy of user data will not be represented in the reference counter. This ultimately causes the actual data deduplication efficiency of the storage location to suffer, but in a controlled manner. Accordingly, increasing the size of the field for a reference counter may desirably be able to increase the actual data deduplication efficiency of the storage location.

In still other approaches, operation 920 may include sending one or more instructions to perform a supplemental deduplication operation which reduces the number of the copies of user data stored in the one or more logical volumes. In other words, operation 920 may include triggering a process that is able to further deduplicate the data in memory at the storage location, e.g., that may have been missed in a previous deduplication process. For instance, the supplemental deduplication operation may identify a number of fingerprints which point to different copies of the same data in the storage location, and initiate a combination of the identified fingerprints, thereby improving deduplication.

According to an example, which is in no way intended to limit the invention, the supplemental deduplication operation may include identifying repeat copies of the same user data that are stored in the one or more logical volumes at the storage location. Repeat copies of the same user data at the storage location may be identified by comparing the fingerprints in a fingerprint database and/or the entries in a volume sketch table for matches. Moreover, once the repeat copies have been identified, the supplemental deduplication operation may include deduplicating the repeat copies. For instance, identifying that one or more repeat copies exist may trigger a more exhaustive deduplication mechanism which is actually able to locate each of the duplicate copies, e.g., as would be appreciated by one skilled in the art after reading the present description.

It follows that the one or more instructions sent in operation 920 are intended to improve the performance by which data deduplication is performed at the storage location. Again, how this improvement is actually achieved may vary depending on the desired approach, but the ultimate goal may be to increase deduplication. Although data deduplication is desirable in that it increases capacity utilization by removing redundant copies of data from storage, it consumes system resources in doing so. Accordingly, although operation 920 may cause an improvement to the actual deduplication efficiency at the storage location, additional system resources may be consumed in order to do so.

Returning to decision 918, method 900 proceeds to operation 922 in response to determining that the difference is not outside the range. There, operation 922 includes sending one or more instructions to the storage location to adjust deduplication settings which will decrease the actual deduplication efficiency value moving forward. As restated above, although data deduplication is desirable in that it increases capacity utilization by removing redundant copies of data from memory, it consumes system resources in doing so. It follows that in some instances it may be desirable to reduce deduplication efficiency in an effort to conserve system resources. For example, an actual deduplication efficiency value may be decreased in response to determining that it is within a certain percentage of the potential deduplication efficiency value, above a desired deduplication efficiency value, etc.

In some approaches, the one or more instructions sent to the storage location in operation 922 may include one or more instructions to decrease a size of a fingerprint database which corresponds to the one or more logical volumes. In other approaches, the one or more instructions sent to the storage location in operation 922 may include one or more instructions to decrease a size of the field for a reference counter which corresponds to the one or more logical volumes.

In addition to evaluating and adjusting actual deduplication efficiency values for a given storage location, method 900 may also be capable of determining workload statistics of the storage location. For instance, looking to operation 924, workload data is received from the storage location at node 901. It should be noted that the specific placement of operation 924 in FIG. 9A is in no way intended to limit the invention. Rather, workload data corresponding to a storage location may be received at any point during method 900.

Looking to operation 926, workload statistics of the storage location are determined by analyzing the workload data which corresponds to the storage location. It follows that the workload statistics determined in operation 926 correspond to the storage location from which the workload data was received in operation 924. As described above, by implementing a method which is able to interact with storage locations which are currently being used to store user data, the various approaches herein are able to improve performance over time by providing solutions to specific situations which the storage locations are experiencing as a result of actual use. Again, conventional products have been unable to achieve this non-synthetic functionality. Accordingly, these workload statistics may provide even further improvements to functionality which have been conventionally unattainable.

Furthermore, operation 928 includes outputting the determined workload statistics. Although operation 928 is illustrated as outputting the determined workload statistics back to node 901, the statistics may be output in any desired manner, e.g., such as to memory for storage, to a different storage location for workload management purposes, directly to a user, call home information, etc. In some approaches the workload statistics may even be output along with the result of the comparison performed in operation 914 above. Accordingly, in some approaches operation 916 and operation 928 may be performed in parallel and/or simultaneously. For example, the result of the comparison may be output with the determined workload statistics in the same packet of data sent to the storage location at node 901. Some of the approaches described herein may be able to use the workload statistics along with the result of the comparison performed in operation 914 to identify any missed deduplication potential at a storage location, and whether this missed potential is related to specific volumes and/or other identifiers of specific groupings of data (e.g., files). As a result, method 900 may be able to provide adequate information to the storage location such that workload and deduplication efficiency analysis may be performed according to the desired approach.

As mentioned above, the various processes included in method 900 allow for deduplication efficiency to be evaluated and improved across an online system. By connecting at least one user-based storage location to a central storage management location using a network connection (e.g., as seen in the distributed data storage system 800 of FIG. 8), the deduplication efficiency of the user-based storage location may be evaluated and potentially improved by the central storage management location. Accordingly, various ones of the embodiments included herein are able to measure and improve the actual deduplication effectiveness levels achieved by storage systems that are in use, e.g., at user locations.

According to an in-use example, which is in no way intended to limit the invention, a volume sketch table is created at a central storage management location. The volume sketch table corresponds to the data stored at a given storage location which is coupled to the central storage management location, such that the central storage management location and the storage location share an "online" relationship, e.g., as described in the various approaches included herein.

The volume sketch table preferably includes a number of entries which is greater than or equal to the number of fingerprints received from the storage location. In other words, the volume sketch table is preferably large enough to represent each fingerprint received from the storage location. Each of the entries in the volume sketch table also preferably has an identifier which corresponds thereto. Each of the identifiers may thereby be used to indicate if the fingerprint which corresponds to the respective entry in the volume sketch table correspond to an "owner" (an actual copy of user data stored in memory), or a "referrer" (a pointer to an actual copy).

A sketch aggregation process which counts the number of fingerprints which correspond to "owners". In other words, the sketch aggregation process may evaluate the entries in the volume sketch table and determine a total number of fingerprints which correspond to an actual copy of user data stored in memory at the storage location. For instance, the sketch aggregation process may simply tally up the number of entries in the volume sketch table having a respective indicator which is set.

Moreover, an actual deduplication efficiency value "E" be determined for the storage location using Equation 1 below.

$$E = F/O \quad \text{Equation 1}$$

As shown, "F" represents the total number of unique fingerprints at the storage location, while "O" represents the total number of fingerprints which correspond to an actual copy of user data stored in memory at the storage location (e.g., "owners"). As previously mentioned, a storage system implementing data deduplication may strive to achieve an "ideal" storage environment in which only one actual copy of each file exists in memory, and any additional references to and/or instances of the same file merely exist in the memory as pointers which refer back to the single actual copy of the file. Accordingly, an "ideal" implementation of data deduplication may result in a situation where the number of unique fingerprints is equal to the number of actual copies of user data in the storage location. In other words, Equation 1 may produce a value of E=1 in an "ideal" data deduplication scenario. Alternatively, the value of "E" decreases as the actual deduplication effectiveness at the storage location decreases, e.g., as will be appreciated by one skilled in the art after reading the present description.

Based on the outcome of Equation 1, additional steps may be taken in order to adjust data deduplication performance at the storage location. In some embodiments, the size of a fingerprint database implemented at the storage location may be adjusted by a predetermined adjustment factor. In some approaches the adjustment factor may be a constant value, while in other approaches the adjustment factor may be based, at least in part, on the actual deduplication efficiency value. For example, the adjustment factor may increase as the actual deduplication efficiency value decreases. In other embodiments the size of a field for the reference counter may be increased, an offline deduplication process to identify missed deduplication instances may be employed, etc., in an effort to adjust data deduplication performance at the storage location.

It follows that various ones of the embodiments included herein are able to evaluate and adjust the actual deduplication effectiveness levels achieved at storage locations that are being used in non-synthetic data storage environments. Moreover, some of the embodiments described herein are able to determine deduplication effectiveness levels which may potentially be achieved given ideal conditions (e.g., no duplicate copies exist in the entire storage system). Actual deduplication effectiveness levels may further be compared to potential deduplication effectiveness levels in order to determine an attainable amount of improvement in performance for one or more storage locations that are actually being used to store non-synthetic user data. Some of the approaches described herein are even able to identify any missed deduplication potential at a storage location, and whether this missed potential is related to specific volumes and/or other identifiers of specific groupings of data. Moreover, these determinations may be made at a centralized (e.g., off-site) location which is in communication with the one or more storage locations via an online relationship, thereby relieving the one or more storage locations from the corresponding computational overhead. Accordingly, the various improvements to performance achieved herein may be attained without undesirably hindering performance levels and/or efficiency at the storage locations themselves. Moreover, some approaches are desirably able to evaluate deduplication algorithms during design time, in addition to receiving "call home information" from clients regarding deduplication efficiency experienced in practice at various customer locations.

These improvements further provide the desired ability to evaluate a deduplication algorithm at design time of a storage location as well as over time as the storage location is used to satisfy the data storage requests of users. Moreover, the online relationship that is shared between one or more storage locations and a central storage management location provides users (e.g., clients) the ability to request deduplication analysis regarding the efficiency of a storage location in the field. Workload statistics corresponding to a storage location may also be used to incorporate adaptive logic into any deduplication analysis performed on the measured effectiveness at the storage location. Further still, some of the embodiments included herein introduce the ability to selectively deploy additional efforts such as supplemental deduplication mechanisms which are able to strengthen online deduplication detection and thereby improve the data reduction ratio achieved at a given storage location, or even offline deduplication processes which may be implemented in certain situations. This functionality may be achieved as a result of a single scan performed at one or more storage locations, while also providing a hierarchal break down of the results on a per system basis, a per volume basis, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    determining which of a plurality of fingerprints correspond to a copy of user data stored in one or more logical volumes at a storage location, and which of the plurality of fingerprints correspond to a pointer that points to a copy of user data stored in the one or more logical volumes at the storage location;
    determining a number of unique fingerprints;
    determining a number of the copies of user data stored in the one or more logical volumes;
    using the number of the copies of user data and the number of unique fingerprints to calculate an actual deduplication efficiency value;
    using the number of the copies of user data and the number of unique fingerprints to calculate a potential deduplication efficiency value;
    comparing the actual deduplication efficiency value to the potential deduplication efficiency value; and
    outputting a result of the comparison.

2. The computer-implemented method of claim 1, comprising:
    determining whether a difference between the actual deduplication efficiency value and the potential deduplication efficiency value is outside a range; and
    sending one or more instructions to the storage location to adjust deduplication settings in response to determining that the difference is outside the range.

3. The computer-implemented method of claim 2, wherein sending the one or more instructions includes sending one or more instructions to increase a size of a fingerprint database which corresponds to the one or more logical volumes.

4. The computer-implemented method of claim 2, wherein sending the one or more instructions includes sending one or more instructions to increase a size of a reference counter which corresponds to the one or more logical volumes.

5. The computer-implemented method of claim 2, wherein sending the one or more instructions includes sending one or more instructions to perform a supplemental deduplication operation which reduces the number of the copies of user data stored in the one or more logical volumes.

6. The computer-implemented method of claim 5, wherein the deduplication operation includes:
    identifying repeat copies of the user data stored in the one or more logical volumes; and
    deduplicating the repeat copies.

7. The computer-implemented method of claim 2, comprising:
    sending one or more instructions to the storage location to decrease a size of a fingerprint database which corresponds to the one or more logical volumes in response to determining that the difference is not outside the range.

8. The computer-implemented method of claim 1, wherein determining which of the fingerprints correspond to a copy of user data stored in the one or more logical volumes, and which of the fingerprints correspond to a pointer that points to a copy of user data stored in the one or more logical volumes includes:
    creating an entry in a sketch table for each fingerprint received, wherein each entry includes an identifier; and
    updating each of the identifiers to indicate whether the respective entry in the sketch table represents a fingerprint which corresponds to a copy of user data stored in the one or more logical volumes, or represents a fingerprint which corresponds to a pointer which points to a copy of user data stored in the one or more logical volumes.

9. The computer-implemented method of claim 1, comprising:
    determining workload statistics of the storage location by analyzing workload data which corresponds to the storage location; and
    outputting the workload statistics along with the result of the comparison.

10. A computer program product comprising a computer readable storage medium having program instructions embodied therewith, wherein the computer readable storage medium is not a transitory signal per se, the program instructions readable and/or executable by a processor to cause the processor to perform a method comprising:
    determining, by the processor, which of a plurality of fingerprints correspond to a copy of user data stored in one or more logical volumes at a storage location, and which of the plurality of fingerprints correspond to a pointer that points to a copy of user data stored in the one or more logical volumes at the storage location;
    determining, by the processor, a number of unique fingerprints;
    determining, by the processor, a number of the copies of user data stored in the one or more logical volumes;
    using, by the processor, the number of the copies of user data and the number of unique fingerprints to calculate an actual deduplication efficiency value;
    using, by the processor, the number of the copies of user data and the number of unique fingerprints to calculate a potential deduplication efficiency value;
    comparing, by the processor, the actual deduplication efficiency value to the potential deduplication efficiency value; and
    outputting, by the processor, a result of the comparison.

11. The computer program product of claim 10, the program instructions readable and/or executable by the processor to cause the processor to perform the method comprising:
    determining, by the processor, whether a difference between the actual deduplication efficiency value and the potential deduplication efficiency value is outside a range; and sending, by the processor, one or more instructions to the storage location to adjust deduplication settings in response to determining that the difference is outside the range.

12. The computer program product of claim 11, wherein sending the one or more instructions includes sending one or more instructions to increase a size of a fingerprint database which corresponds to the one or more logical volumes.

13. The computer program product of claim 11, wherein sending the one or more instructions includes sending one or more instructions to increase a size of a reference counter which corresponds to the one or more logical volumes.

14. The computer program product of claim 11, wherein sending the one or more instructions includes sending one or more instructions to perform a supplemental deduplication operation which reduces the number of the copies of user data stored in the one or more logical volumes.

15. The computer program product of claim 14, wherein the deduplication operation includes:
  identifying repeat copies of the user data stored in the one or more logical volumes; and
  deduplicating the repeat copies.

16. The computer program product of claim 11, the program instructions readable and/or executable by the processor to cause the processor to perform the method comprising:
  sending, by the processor, one or more instructions to the storage location to decrease a size of a fingerprint database which corresponds to the one or more logical volumes in response to determining that the difference is not outside the range.

17. The computer program product of claim 10, wherein determining which of the fingerprints correspond to a copy of user data stored in the one or more logical volumes, and which of the fingerprints correspond to a pointer that points to a copy of user data stored in the one or more logical volumes includes:
  creating an entry in a sketch table for each fingerprint received, wherein each entry includes an identifier; and
  updating each of the identifiers to indicate whether the respective entry in the sketch table represents a fingerprint which corresponds to a copy of user data stored in the one or more logical volumes, or represents a fingerprint which corresponds to a pointer which points to a copy of user data stored in the one or more logical volumes.

18. The computer program product of claim 10, the program instructions readable and/or executable by the processor to cause the processor to perform the method comprising:
  determining, by the processor, workload statistics of the storage location by analyzing workload data which corresponds to the storage location; and
  outputting, by the processor, the workload statistics along with the result of the comparison.

19. A system, comprising:
  a processor; and
  logic integrated with the processor, executable by the processor, or integrated with and executable by the processor, the logic being configured to:
    determine, by the processor, which of a plurality of fingerprints correspond to a copy of user data stored in one or more logical volumes at a storage location, and which of the plurality of fingerprints correspond to a pointer that points to a copy of user data stored in the one or more logical volumes at the storage location;
    determine, by the processor, a number of unique fingerprints;
    determine, by the processor, a number of the copies of user data stored in the one or more logical volumes;
    use, by the processor, the number of the copies of user data and the number of unique fingerprints to calculate an actual deduplication efficiency value;
    use, by the processor, the number of the copies of user data and the number of unique fingerprints to calculate a potential deduplication efficiency value;
    compare, by the processor, the actual deduplication efficiency value to the potential deduplication efficiency value; and
    output, by the processor, a result of the comparison.

20. The system of claim 19, the logic being configured to:
  determine, by the processor, whether a difference between the actual deduplication efficiency value and the potential deduplication efficiency value is outside a range; and
  send, by the processor, one or more instructions to the storage location to adjust deduplication settings in response to determining that the difference is outside the range.

21. The system of claim 20, wherein sending the one or more instructions includes: sending one or more instructions to increase a size of a fingerprint database which corresponds to the one or more logical volumes and/or sending one or more instructions to increase a size of a reference counter which corresponds to the one or more logical volumes.

22. The system of claim 20, wherein sending the one or more instructions includes sending one or more instructions to perform a supplemental deduplication operation which reduces the number of the copies of user data stored in the one or more logical volumes, wherein the deduplication operation includes:
  identifying repeat copies of the user data stored in the one or more logical volumes; and
  deduplicating the repeat copies.

23. The system of claim 20, the logic being configured to:
  send, by the processor, one or more instructions to the storage location to decrease a size of a fingerprint database which corresponds to the one or more logical volumes in response to determining that the difference is not outside the range.

24. The system of claim 19, wherein determining which of the fingerprints correspond to a copy of user data stored in the one or more logical volumes, and which of the fingerprints correspond to a pointer that points to a copy of user data stored in the one or more logical volumes includes:
  creating an entry in a sketch table for each fingerprint received, wherein each entry includes an identifier; and
  updating each of the identifiers to indicate whether the respective entry in the sketch table represents a fingerprint which corresponds to a copy of user data stored in the one or more logical volumes, or represents a fingerprint which corresponds to a pointer which points to a copy of user data stored in the one or more logical volumes.

25. The system of claim 19, the logic being configured to:
  determine, by the processor, workload statistics of the storage location by analyzing workload data which corresponds to the storage location; and
  output, by the processor, the workload statistics along with the result of the comparison.

* * * * *